United States Patent [19]

Chauveau et al.

[11] Patent Number: 4,566,563

[45] Date of Patent: Jan. 28, 1986

[54] COMBINED LIVE AXLES AND BRAKE ASSEMBLIES FOR VEHICLES

[75] Inventors: Jean-Marc Chauveau, Viroflay; Michel Schmitt, Fresnes, both of France

[73] Assignee: Lucas Industries Limited, Birmingham, England

[21] Appl. No.: 671,806

[22] Filed: Nov. 15, 1984

Related U.S. Application Data

[63] Continuation of Ser. No. 338,879, Jan. 12, 1982, abandoned.

[30] Foreign Application Priority Data

Jan. 21, 1981 [FR] France ................................ 81 01035

[51] Int. Cl.[4] ........................ B60T 1/06; F16D 55/18; B60B 27/02
[52] U.S. Cl. .................. 188/18 A; 188/72.4; 188/73.32; 301/108 S
[58] Field of Search ................ 188/18 A, 71.5, 71.6, 188/72.4, 73.32, 264 D, 170; 192/3 H, 4 A; 74/411.5; 301/108 S, 108 SC, 6 E

[56] References Cited

U.S. PATENT DOCUMENTS

| | | | |
|---|---|---|---|
| 3,941,219 | 3/1976 | Myers | 188/264 D |
| 4,010,830 | 3/1977 | Logus et al. | 192/4 A |
| 4,142,615 | 3/1979 | Sidles, Jr. et al. | 188/71.5 |
| 4,223,769 | 9/1980 | Servanton et al. | 192/4 A |
| 4,407,382 | 10/1983 | Dziuba et al. | 188/71.5 X |

FOREIGN PATENT DOCUMENTS

| | | |
|---|---|---|
| 1434845 | 5/1976 | United Kingdom . |
| 1464101 | 2/1977 | United Kingdom . |

Primary Examiner—Bruce H. Stoner, Jr.
Assistant Examiner—Robert J. Oberleitner
Attorney, Agent, or Firm—Scrivener, Clarke, Scrivener & Johnson

[57] ABSTRACT

A brake of the multi-plate disc type is mounted at the end of an axle of a vehicle to brake it through the intermediary of a reduction gear mechanism, and the brake is operated by an hydraulic control system which extends to the brake from a portion inboard of bearings for a hub on which a wheel is mounted. A removable external cover is itself disposed outwardly of the brake to provide direct access to it when it is removed and to ensure the completeness and liquid-tightness of a closed cooling circuit for cooling the brake.

8 Claims, 3 Drawing Figures

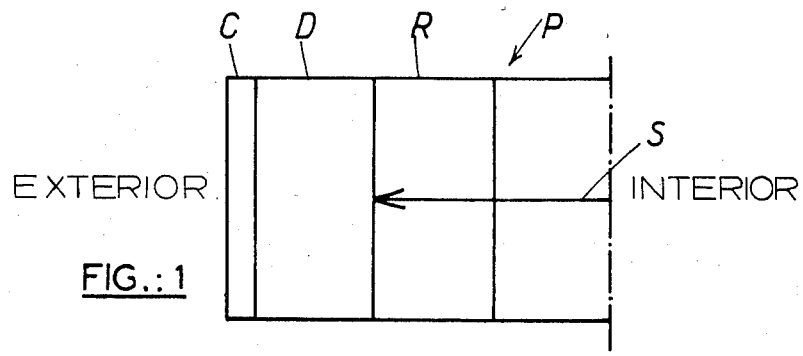
FIG.: 1
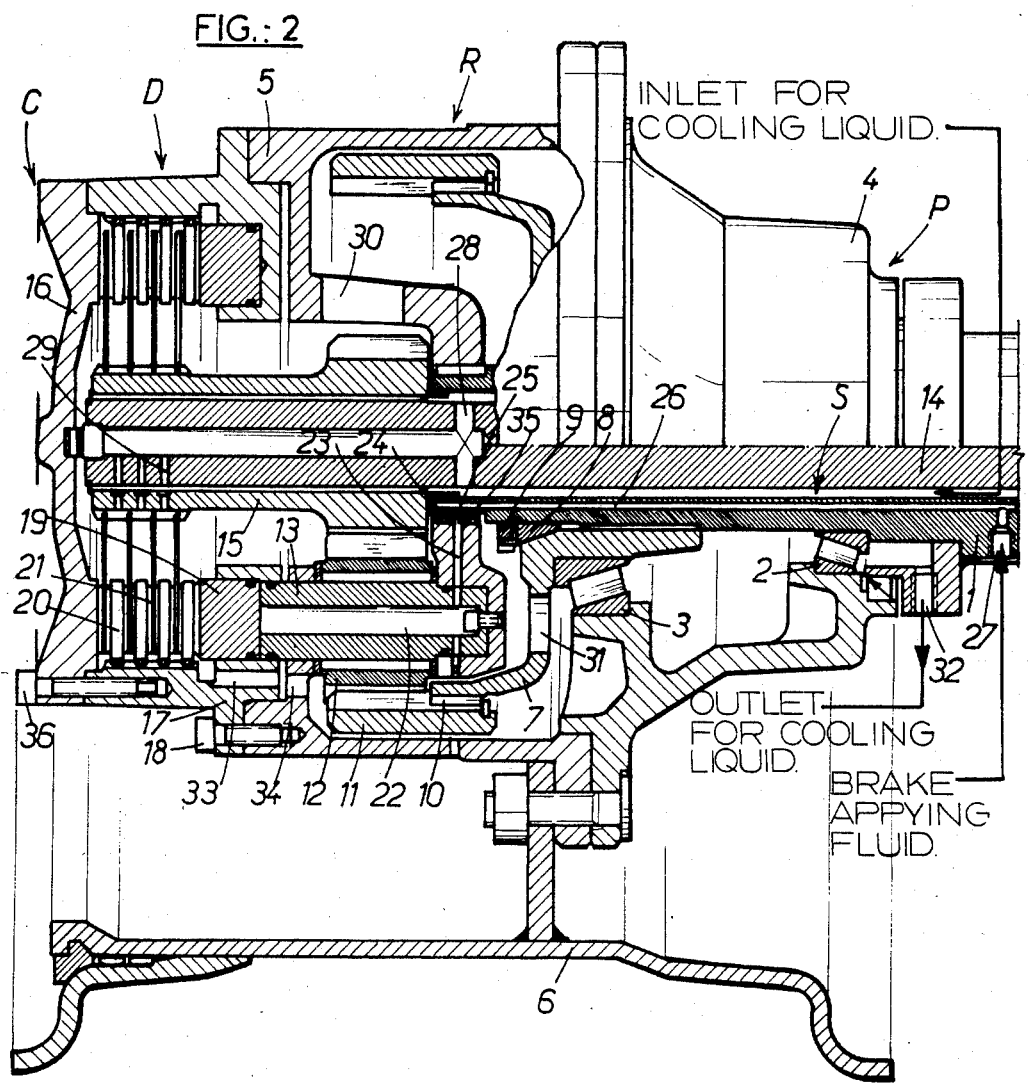
FIG.: 2

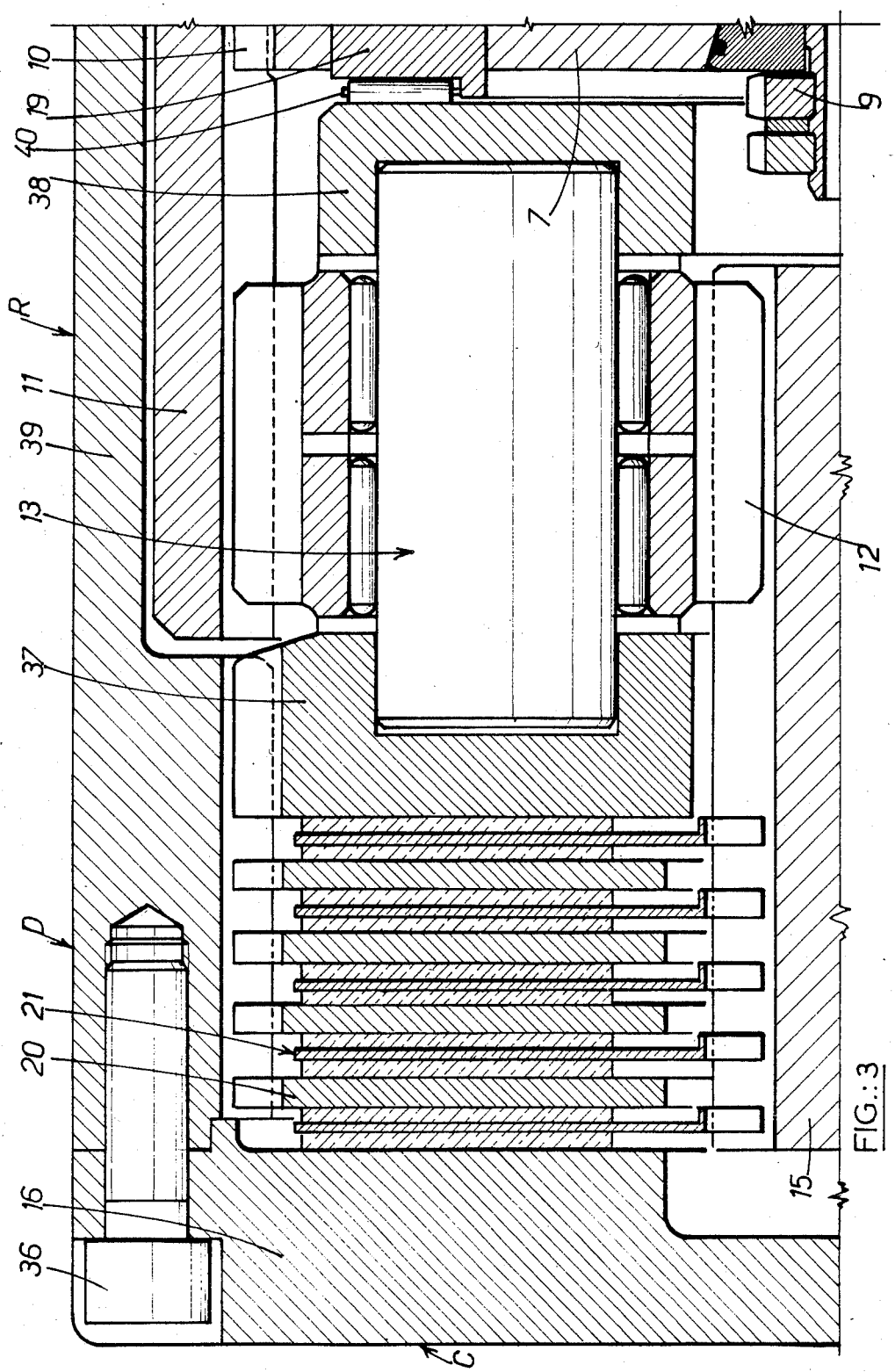

COMBINED LIVE AXLES AND BRAKE ASSEMBLIES FOR VEHICLES

This application is a continuation, of application Ser. No. 338,879, filed Jan. 12, 1982, now abandoned.

SPECIFIC DESCRIPTION

This invention relates to a combined live axle and brake assembly for vehicles of the kind comprising a drive shaft which is housed within a relatively stationary axle tube on which a hub, adapted to be driven by the shaft and comprising the mounting for the wheel, is journalled for rotation on wheel bearings, the brake comprising relatively rotatable friction members associated with the axle.

Wheels of heavy weight are at present provided with powerful brakes with multiple stacked friction discs able, under hydraulic control, to be pressed one against another so as to bring about the required friction for effective braking. The heat generated by this friction may be removed by a cooling liquid circulating in a closed circuit and serving to bathe the friction discs. Speed reduction gear is usually interposed in the transmission which, necessarily, is quite complicated and bulky, while the space available to accommodate it is further reduced.

Such braking mechanisms with liquid-cooled friction discs, and coupled to speed reduction gearing, are nowadays widely used and operate altogether satisfactorily.

However, they give rise on the other hand to very severe technical problems of maintenance and of repair since, to obtain access to the heart of the brake so as to replace a defective or worn component, one disturbs the speed reduction gear, which necessitates complicated and delicate operations for disassembling and reassembling the latter. These problems are moreover correspondingly more pronounced when one is dealing with wheels which are of large dimensions are often very heavy, yielding poorly to these manipulations without specialised equipment and personnel. These jobs of maintenance and repair of the brake further imply a lengthy immobilisation of the machinery, not to speak of the disturbances caused to the sealing of the hydraulic control of the brake.

The present invention enables these difficulties to be overcome thanks to a mechanical agency designed to be able readily to offer suitable and direct access to the heart of the disc brake, without requiring any demounting of the wheel or even a part such as the speed reduction gear and without giving rise to any disturbance in the hydraulic control circuit of the brake.

According to our invention a combined live axle and brake assembly comprises a drive shaft which is housed within a relatively stationary axle tube on which a hub, adapted to be driven by the shaft and comprising a mounting for the wheel, is journalled for rotation on wheel bearings, the brake comprising a housing, relatively rotatable friction members associated with the axle and disposed within the housing in a position outboard of the wheel bearings, first and second axially spaced braking faces provided on the outboard and inboard sides respectively of the brake and between which the friction members are adapted to be clamped to apply the brake, an end cover forming part of the housing and externally removable to provide direct access to the brake, the end cover having an inner face which constitutes the first braking face, a movable member which is subjected to a brake-applying force, the movable member having an inner face which constitutes the second braking face, and a fluid control system which extends from the interior of the assembly inboard of the bearings to the brake, the fluid control system including at least one piston for producing a brake applying force, a bore in the housing in which the piston works, the bore being disposed outboard of the wheel bearings and inboard of the brake, an inlet port for brake-applying fluid located inboard of the wheel bearings, and a duct extending from the inlet port to the bore to supply fluid under pressure to the piston.

This has the advantage that direct access to the brake can be obtained, simply by removing the end cover, and the piston can be serviced, for example to replace seals without first having to remove the wheel or disassemble the wheel bearings.

When reduction gearing is disposed between the wheel bearings and the brake, the piston can be located between the gearing and the brake, or between the bearings and the gearing in which latter case the piston acts on the brake through a movable member of the reduction gearing.

The basic idea of this mechanical agency is illustrated in FIG. 1 of the accompanying drawings where there is shown in a block diagram the whole of the mechanism mounted at the end of the axle P of a vehicle to brake the latter through the intermediary of a speed-reducing gear R associated with a stacked disc brake device D which is closed by a removable cap or cover C and which is operated by an hydraulic control S.

Specifically the friction members comprise a stack of discs D situated towards the outside of the axle P beyond the reduction gear R, the cover C being itself disposed outside the assembly of discs D, so that it is only necessary to remove this cover C to obtain direct access to the discs D, without disturbing either the reducing gear R or the system of hydraulic control for braking S. In providing a cover C of a diameter greater than that of the discs D, these last can easily be withdrawn or introduced through the wide opening thus uncovered.

The following description of the accompanying drawings, given by way of a non-limitative example, will make it easy to understand how the invention can be put into effect.

FIG. 1 is a block diagram of which has already been noted in the foregoing introduction.

FIG. 2 is an axial cross-section of an embodiment of the present invention.

FIG. 3 is a similar fragmentary view of a modified embodiment.

In the embodiment of FIG. 2 the bell-shaped part of the vehicle axle P supports, through the intermediary of conical bearings 2 and 3, the boss 4 of the reduction gear R on which there is fixed the rotary housing 5 thereof as well as the wheel 6. An assembly comprising a plate 7, a conical wedge 8 and a nut 9 enables the play of the bearings 2 and 3 to be adjusted. The plate 7 also carries fixed teeth 10 intended to immobilise in rotation a sun gear in the form of an annulus 11 with which engage planet gear pinions 12 rotating on axles 13, themselves carried by the rotary housing 5 of the reduction gear R which thus performs the function of a planet gear carrier. The movement is controlled by the drive shaft 14 on which is fixed the central pinion 15 of the reduction gear R, which central pinion engages the planet gears 12. These latter being in reaction against the fixed teeth 10 of the exterior, non-rotary sun 11, causes rotation of the satellite-carrier housing 5 which drives the wheel 6 of the vehicle and the boss 4 of the reduction gear R.

Therefore it can be seen that the arrangement of the disc brake D which is disposed outside the reduction gear R is accessible without demounting the wheel 6 and the friction members can be changed without the need to purge the hydraulic control circuit S, solely by opening the cover C, here in the form of a cap 16.

This brake D comprises a rotary housing 17 mounted on the rotary housing 5 of the reduction gear by means of a bolt 18. In a modification the two rotary casings 5 and 17 can be made unitarily.

For its part, the hydraulic control system S terminates at a pusher or annular piston 19 installed in the brake housing 17. In a modification this annular piston 19 can be replaced by a set of cylindrical pistons duly distributed in a ring around the axis.

The heart of the brake assembly D is constituted by a stack of friction members comprising rotary discs which are alternately smooth discs 20 and pad-carrying discs 21 both being able to slide axially. The smooth discs 20 are made rotationally immovable relative to the casing 17 by means of grooves or any other equivalent means permitting their axial movement under the action of the annular piston 19, while the pad-carrying discs 21 are likewise rotationally immovable relative to the central pinion 15. Thus, when hydraulic control system S operates the piston 19, the smooth discs 20 and the pad-carrying discs 21 press one against the other and against the cap 16. The central pinion 15 and its pad-carrying discs 21 rotating at the higher speed of the driving shaft 14, while the smooth discs rotate at the reduced speed of the wheel 6, brings about braking of the relative speed between these two series of discs 20 and 21.

The reduction ratio of the epicyclic train R being greater than 2 in most cases, it follows that this relative braking speed is greater than the speed of the wheel 6 even if the discs 20 and 21 rotate in the same directions, and a fortiori if they rotate in opposite directions (in the case of a supplementary reduction stage), in which case the respective speeds are added together. Also, for an equal force, the braking couple can be weaker than in the ordinary case of a classic disc brake rotating at the speed of the wheel.

The annular piston 19 is pressed against the discs 20 and 21 by hydraulic pressure coming from the control system S. This hydraulic pressure is exerted by a liquid such as oil introduced behind the annular piston 19 by a circuit constituted—going from downstream towards the source—by: a longitudinal drilling 22 in the satellite-carrying axle 13, a transverse drilling 23 therein, the gap between two rotating seals 24 maintained apart by a spacer 35, a hole 25, a drilling 26 and lastly a tapped connector in the trumpet-shaped part of the axle 1.

This oil circuit of the hydraulic control system S of the disc brake D is separate and distinct from another circuit which will be described below and in which there is caused to circulate oil—if desired, different from that in the control system S—serving to bathe the discs 20, 21 of the brake device D so as to cool them, so as to be then expelled to an external cooler (not shown), then recycled in the brake D. More precisely, this circulation of cooling oil for the brake is effected along the following path:

Arriving by way of the interior of the axle P around the driving shaft 14, then passing into a drilling 28 of this latter, terminating through a series of little holes 29 which also cross the central pinion 15 to be discharged between the pad-carrying discs 21. The oil is centrifuged over the discs by the rotation of the shaft and cool them.

Returning through holes 30 and the satellite carrier 13 and also through drillings 33 and 34 in the two housings 5 and 17, then holes 31 in the plate 7, so as finally to traverse the bearings 2 and 3, and recovery in a tapped connection 32.

It will be noted that it is only necessary to lift off the cap 16 forming the cover C, by simply unscrewing the fixings 36 in order largely to uncover the braking device D. It is then possible to extract by axial sliding movement the discs 20, 21, to replace those which are defective and to put them back in place by reverse sliding movement, without the least disturbance either to the speed reducing gear R or the hydraulic control system S which remain intact. The cap 16 being repositioned and the screws 36 tightened up, the whole mechanism is complete again.

In the modification of FIG. 3, the control device for pushing the disc brakes 20, 21 is slightly different from the preceding, in the sense that the satellite carrier 13 is here constituted by two components 37, 38 assembled together and slides laterally on a set of teeth on a unitary housing 39 common to the reduction gear R and the disc brake D.

The plate 7 is integrated into the hydraulic control system, being seen to be fitted with an annular piston 19, itself provided with a thrust bearing 40. However to prevent any rotation of this piston, pins are interposed between the piston 19 and the plate 7 (each pin being fixed in the plate 7 and sliding in the piston 19).

On braking, the hydraulic pressure pushes the piston 19 which, through the intermediary of the thrust bearing 40, pushes in its turn on the satellite carrier 13 which presses the discs 20 and 21 against the cap 16.

It goes without saying that the embodiments described are not the only examples and that one could modify them, particularly by substitution of technical equivalents without departing in this way from the scope of the invention.

We claim:

1. A combined live axle and brake assembly for vehicles comprising a wheel, a drive shaft, a relatively stationary axle tube within which said drive shaft is housed, inner and outer axially spaced wheel bearings mounted on said axle tube, a hub journalled for rotation on said wheel bearings, said hub being adapted to be driven by said shaft and comprising a mounting for the wheel, and said brake comprising a housing, relatively rotatable first and second sets of friction members associated with said axle and disposed within said housing in a position outboard of said wheel bearings, said first set of friction members being driven by said shaft, reduction gearing through which said second set of friction members is driven from said shaft at a different speed, first and second axially spaced braking faces provided on outboard and inboard sides respectively of said brake and between which said friction members are adapted to be clamped to apply said brake, an end cover forming an externally removable part of said housing, removal of said end cover providing direct access to said brake, and said end cover comprising the only part of said assembly which has to be removed to achieve said direct access, said end cover having an inner face which constitutes said first braking face, a movable member which is subjected to a brake-applying force, said movable member having an inner face which constitutes said second braking face, and a fluid control system which extends from the interior of said assembly inboard of said bearings to said brake, said fluid control system including at least one piston for producing a brake applying force, a bore in said housing in which said piston works, said bore being disposed outboard of said outer wheel bearing and inboard of said friction members, between said brake and said reduction gearing, whereby said piston is accessible after removal of said cover and said braking members without first demounting said wheel from said hub but leaving said reduction gearing intact, an inlet port for brake-applying fluid located inboard of said wheel bearings, and a duct extending from said inlet port to said bore to supply fluid under pressure to said piston.

2. An assembly as claimed in claim 1, wherein said piston acts directly on said friction members, and said control system passes right through said speed reduction gearing.

3. An assembly as claimed in claim 2, wherein said duct extends through at least one element of the reduction gearing.

4. An assembly as claimed in claim 1, wherein said brake is of the oil immersed type with said friction members cooled by liquid circulated in a cooling circuit, and said cover when in place ensures the completeness and liquid tightness of said cooling circuit.

5. An assembly as claimed in claim 4, wherein said cooling circuit for cooling said friction members is separated from said hydraulic control system, the respective cooling and control liquids being distinct from each other and consisting of suitable oils.

6. An assembly as claimed in claim 1, wherein said cover is of a diameter greater than that of said friction members.

7. A combined live axle and brake assembly for vehicles comprising a wheel, a drive shaft, a relatively stationary axle tube within which said drive shaft is housed, inner and outer axially spaced wheel bearings mounted on said axle tube, a hub journalled for rotation on said wheel bearings, said hub being adapted to be driven by said shaft and comprising a mounting for the wheel, and said brake comprising a housing, relatively rotatable first and second sets of friction members associated with said axle and disposed within said housing in a position outboard of said wheel bearings, said first set of friction members being directly driven by said shaft, reduction gearing through which said second set of friction members is driven from said shaft at a different speed, first and second axially spaced braking faces provided on outboard and inboard sides respectively of said brake and between which said friction members are adapted to be clamped to apply said brake, an end cover forming an externally removable part of said housing, removal of said end cover providing direct access to said friction members, and said end cover comprising the only part of said assembly which has to be removed to achieve said direct access, said end cover having an inner face which constitutes said first braking face, a movable member which is subjected to a brake-applying force, said movable member having an inner face which constitutes said second braking face, and a fluid control system which extends from the interior of said assembly inboard of said bearings to said brake, said fluid control system including at least one piston for producing a brake applying force, a bore in said housing in which said piston works, said bore being disposed outboard of said outer wheel bearing and inboard of said friction members, an inlet port for brake-applying fluid located inboard of said wheel bearings, and a duct extending from said inlet port to said bore to supply fluid under pressure to said piston.

8. An assembly as claimed in claim 7, wherein said piston acts on said friction members through an element which forms part of said reduction gearing and is shaped so as to be able to slide axially under the action of said piston.

* * * * *